United States Patent
Davis

[11] 3,850,047
[45] Nov. 26, 1974

[54] O-RING GEAR SHIFT LEVER ISOLATOR
[75] Inventor: Alan R. Davis, Plainwell, Mich.
[73] Assignee: Eaton Corporation, Cleveland, Ohio
[22] Filed: July 14, 1972
[21] Appl. No.: 271,950

[52] U.S. Cl. ............... 74/473 P, 277/29, 403/116, 403/133
[51] Int. Cl. ....... G05g 9/12, B25g 3/38, F16c 11/08
[58] Field of Search ........ 74/473 P; 287/88; 277/29; 308/36.1; 403/133, 116; 137/636.2

[56] References Cited
UNITED STATES PATENTS

| | | | |
|---|---|---|---|
| 1,938,824 | 12/1933 | Fish | 74/473 P |
| 2,057,130 | 10/1936 | Bard | 285/268 X |
| 2,100,642 | 11/1937 | Geyer | 74/473 P |
| 2,155,259 | 4/1939 | Dickson | 277/29 X |
| 3,656,820 | 4/1972 | Pensa | 308/36.1 |

Primary Examiner—Allan D. Herrmann
Attorney, Agent, or Firm—Teagno & Toddy

[57] ABSTRACT

The present invention is directed to a transmission shift mechanism having a shift lever with a ball means between its ends which is located in a housing and supported thereby against transverse horizontal movement. An elastomeric means is seated in the housing with a vent therethrough in order to prevent vertical upward movement of the ball portion and vibration producing metal-to-metal contact between ball and housing while allowing breathing simultaneously. A spring means is located at the opposite side of the ball means in order to prevent corresponding downward movement of the ball portion.

7 Claims, 3 Drawing Figures

PATENTED NOV 26 1974          3,850,047

O-RING GEAR SHIFT LEVER ISOLATOR

This invention relates to a gear shifting mechanism for a heavy-duty truck transmission of the type which includes a shifting stick which is normally manually operated by the driver of the vehicle.

Experience has shown that despite the use of spring, elastomeric materials and other expedients, the vibrations that normally originate in the transmission are transferred ultimately to the shifting assembly area. This results in the vibration of the shift stick, which in all likelihood will produce an audible hum, chatter, or combination thereof.

It is therefore an object of this invention to produce an improved embodiment wherein the shift stick is completely insulated from sources of vibration to eliminate, or reduce the hum or chatter to an unobjectionable level with regard to the vehicle driver.

A further object of the invention is to produce an improved embodiment which is readily adapted to various types and makes of gear shifting mechanism other than heavy-duty truck transmissions.

A still further object is to establish an improved construction which is inexpensive to produce, easy to install, and accessible for easy maintenance.

In accordance with the invention there is provided a gear shift lever assembly for shifting a heavy-duty truck type transmission. The shift lever has a ball means interposed between its two ends. A housing means within the transmission housing is utilized to support the ball portion of the shift lever along its horizontal plane to prevent transverse movement of the shift lever. An elastomeric means is seated in the transmission housing itself for supporting the ball portion of the shift lever against vertical upper movement of the ball portion during operation. Lastly, a spring means is interposed between the opposing end of the ball means and an additional housing means for upwardly urging the ball means against the elastomeric means in order to prevent vertical downward movement of the ball portion.

Preferably, in the specific embodiment of the invention, the spring means is interposed between the housing and a steel stamping which self centers and rides against the ball means of the stick shift. Furthermore, the ball housing seats along its upper most end against elastomeric means with clearances between the ball means and the housing being properly adjusted to such a degree that during shifting, the elastomeric means will be compressed allowing the shift reaction force to be taken by the housing means, providing a solid feel to the shifting lever. In addition, such properly adjusted clearance will also prevent metal-to-metal contact between the shifting lever and the housing means during operation of the transmission between shifts.

For a better understanding of the present invention, together with the other and further objects thereof, reference is had to the following description taken in connection with the accompanying drawings and its scope will be pointed out in the appended claims.

Referring now to the drawings.

Figure 1:
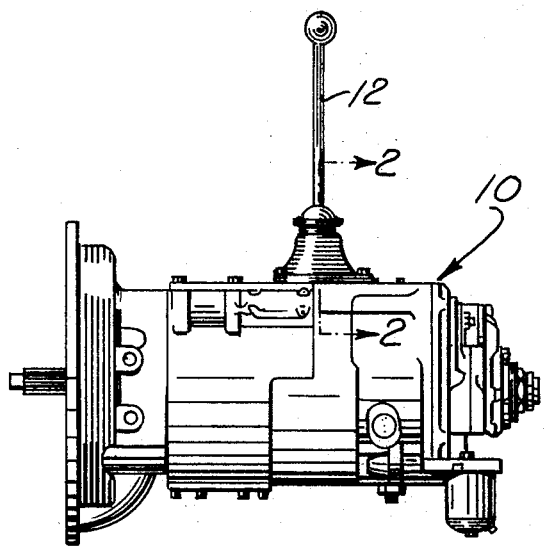
FIG. 1 is an elevational view of the transmission assembly including the gear shift lever assembly which is the pertinent subject matter of the present invention.

Referring now, more particularly, to FIG. 1 which perspectively shows the environment of the present invention and includes a typical heavy-duty truck transmission (10), as a matter of example rather than limitation, which is shifted over a variable speed range by means of the gear shift lever (12). This is the preferable environment over which the present invention is being utilized. However, it would be possible to use the same invention in less sophisticated truck type transmissions as well as in automotive transmission application which do not utilize the normal front fire wall type of mechanical linkage. In an automobile the utilization would, therefore, be in the typical floor type stick shift application.

Figure 2:
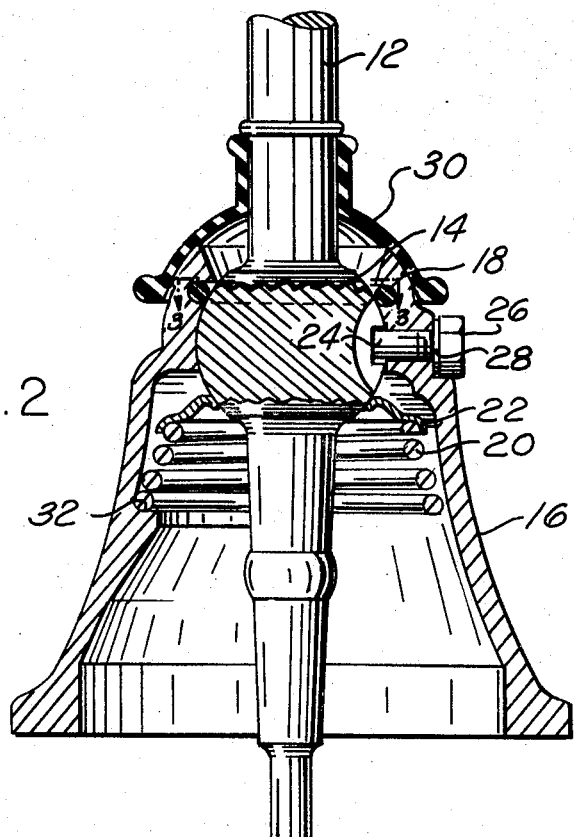
FIG. 2 is a cross-sectional view of the gear shift lever assembly taken along plane 2—2 of FIG. 1.

FIG. 2, shows the detailed environment of the present invention with regard to the cross section taken in FIG. 1 of the gear shift lever assembly. A housing (16) for the overall assembly is constructed of cast iron and is designated as the tower housing (16). This cast iron housing encloses the gear shift lever (12) which has ball means (14) located between its ends. The gear shift lever with the ball means rides up and down vertically and horizontally within the housing unless there is some means to confine the degree of horizontal and vertical movement. A gear shift lever pin (24) abuts against the ball means (14) which limits any horizontal rotation of the ball means. The gear shift lever pin (24) is held in place by means of a flat washer (28) and a nut (26) which holds the pin with respect to the ball means (14) when assembled through the tower housing (16). A proper control of clearances between the ball means (14) and the gear shift lever pin (24) insures that the ball means (14) is properly located. In this manner, the movement of the ball means (14) is taken up by the elastomeric means (18) seated in the tower housing (16), thus reducing and/or preventing any metal-to-metal contact between shifting. Such metal-to-metal contact would proceed to generate the hum or objectional chatter which is the express purpose of this invention to eliminate.

Figure 3:
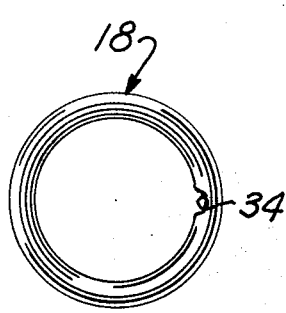
FIG. 3 is a plan view of the o-ring gear shift lever isolator taken along plane 3—3 FIG. 2.

To confine movement of the gear shift lever (12) in a vertical plane, a spring (20) is seated within the abuts against a seat (32) in the tower housing (16). This spring, in turn, pushes against a steel washer (22) which is shaped in such a fashion as to mold uniformly with the ball means (14) of the gear shift lever (12). This washer (22) is free to vertically align itself in order that equal pressures are transferred from the spring (20) to the ball means (14) thru steel washer (22). By means of the spring (20) the entire gear shift lever (12) is urged upwardly within the transmission box against the elastomeric means (18). This degree of urging or biasing in an upward direction must be properly coordinated with the amount of play along the transverse or horizontal plane of ball means (14) in order to assure that no metal-to1metal contact takes place along the horizontal plane during transmission operation between shifts. The o-ring will also prevent brinelling of the ball and housing from continuous and long term metal-to-metal contact. During the actual transmission operation, the transmission sump agitates and expands continuously causing increased sump operating temperature. In turn, this increased operating temperature causes a compression of the air located between the sump and the gear shift lever assembly. This continual compression of the air necessitates that the gear shift lever assembly breathes continuously during transmission operation. This can only be accomplished by providing some type of vent means along the periphery of the elastomeric means (18). This is accomplished as shown in FIG. 3 which depicts a notch (34) along said periphery which permits transmission breathing under actual operating conditions. Such venting of the elastomeric means to be accomplished by cutting a notch along the internal diameter as shown in FIG. 3. Furthermore, this could be similarly accomplished by notching along the outside diameter or by actually cutting a series of non-contiguous grooves along the inside periphery more or less parallel to the axis of the shifting lever. This elastomer might be chosen from any number of materials including rubber, fluorocarbon rubber, teflon, nitrile, or chloroprene rubber. In the specific embodiment of the invention, chloroprene rubber has been chosen as the preferred elastomer.

A tower boot (30) is attached over the top of the entire gear shift lever assembly. This boat (30) serves to flex during the aforementioned breathing function as well as to prevent dust from entering the assembly cavity or transmission mist (transmission fluid and air mixture) from escaping therefrom.

I claim:

1. A transmission shift mechanism comprising, in combination:
   a shift lever having a ball means intermediate its ends;
   a housing means having an annular recess to support said ball portion of the shift lever along its horizontal plane against transverse movement of said shift lever;
   a vented elastomeric means seated in the annular recess of said housing means; and
   a spring means for biasing said ball portion upwardly against said elastomeric and housing means.

2. A transmission shift mechanism comprising, in combination:
   a shift lever having a ball means with upper and lower portions intermediate its ends;
   a housing means having an annular recess to support said ball means of the shift lever along its horizontal plane against transverse movement of said shift lever;
   a vented elastomeric means seated in the annular recess of said housing means for supporting said upper ball portion of said shift lever against the vertical upward movement of said ball portion and permitting the transmission to breath; and
   a spring means for biasing said lower ball portion upwardly against said elastomeric and housing means.

3. A transmission shift mechanism as recited in claim 2 and further characterized by the vented elastomeric means preventing metal-to-metal contact between said ball portion and said housing means.

4. A transmission shift mechanism as recited in claim 3 wherein the elastomeric means is an O-ring.

5. A transmission shift mechanism comprising, in combination:
   a shift lever having a ball means with upper and lower portions intermediate its ends;
   a housing means having an annular recess to support said ball means of the shift lever along its horizontal plane against transverse movement of said shift lever;
   a tower boot affixed to the top portion of said housing means in order to flex and prevent dust from entering said housing means during transmission operation;
   a vented elastomeric means seated in the annular recess of said housing means for supporting said upper portion of said shift lever against the vertical upper movement of said ball portion and permitting the transmission to breath; and
   a spring means for biasing said lower ball portion upwardly against said elastomeric and housing means.

6. A transmission shift mechanism as recited in claim 5 and further including washer means for vertically alignment so that uniform biasing pressure is transferred from the spring means to the ball means through said washer means.

7. A transmission shift mechanism as recited in claim 5 wherein the elastomeric means is an O-ring.

* * * * *